United States Patent [19]

Vinouze et al.

[11] Patent Number: 5,482,590

[45] Date of Patent: Jan. 9, 1996

[54] METHOD FOR FORMING A DISPLAY CELL WITH COUNTER-ELECTRODE CONTACT PICK-UP

[75] Inventors: Bruno Vinouze, Port-Blanc; Jean-Yves Moreno, Sotteville les Rouen; François Lacroix, Lannion, all of France

[73] Assignees: France Telecom Etablissement Autonome De Droit Public; Sagem, both of Paris, France

[21] Appl. No.: 224,977

[22] Filed: Apr. 8, 1994

[30] Foreign Application Priority Data

Apr. 15, 1993 [FR] France ................................. 93 04443
Aug. 10, 1993 [FR] France ................................. 93 09817

[51] Int. Cl.⁶ .................................................. B32B 31/00
[52] U.S. Cl. ................................. 156/272.8; 156/273.7; 156/275.5; 156/275.7
[58] Field of Search ........................ 156/272.8, 273.7, 156/275.5, 275.7

[56] References Cited

U.S. PATENT DOCUMENTS 4,600,273  7/1986  Ohno .

FOREIGN PATENT DOCUMENTS 2722387  11/1977  Germany .

OTHER PUBLICATIONS

Patent Abstracts of Japan, vol. 6, No. 125 (P–127), Jul. 10, 1982 & JP–A–57 052 027, Mar. 27, 1982.

Patent Abstracts of Japan, vol. 15, No. 296 (P–1231), Jul. 26, 1991, JP–A–03 102 325, Apr. 26, 1991.

Patent Abstracts of Japan, vol. 6, No. 252, (P–161), Dec. 10, 1982 & JP–A–57 148 721, Sep. 14, 1982.

*Primary Examiner*—Chester T. Barry
*Attorney, Agent, or Firm*—Oblon, Spivak, McClelland, Maier & Neustadt

[57] ABSTRACT

A method for forming a display cell with counter-electrode contact pick-ups. Contact blocks are separated from counter-electrode contacts by means of a passivation film. An electrical connection between the counter-electrode and the contacts is obtained by calcining the glue of the blocks to render it conductive by the use of a laser beam. The passivation film and counter-electrode contact are also perforated by using the laser beam.

2 Claims, 3 Drawing Sheets

METHOD FOR FORMING A DISPLAY CELL WITH COUNTER-ELECTRODE CONTACT PICK-UP

FIELD OF THE INVENTION

The present invention concerns a method of forming a display cell with counter-electrode contact pick-ups which can be used to forming display screens, especially liquid crystals display screens.

BACKGROUND OF THE INVENTION

A liquid crystal display cell generally includes a first transparent plate covered with a counter-electrode and a second plate, also transparent, covered with addressing lines and columns, and inactive matrix screens with a matrix of control transistors and pixels. These two plates are kept apart by spacers and form a volume filled with liquid crystals.

The counter-electrode is generally constituted by a fine film of tin or indium oxide (ITO). It may be completed by an optical mask or by colored filters.

FIGS. 1 and 2 illustrate a conventional method for forming such a cell, especially showing the means for forming the electric connection between the counter-electrode and the control circuits placed outside the cell.

In order to form this cell, a first plate P1, known as a counter-electrode plate, is made for example of glass, on which the counter-electrode CE is placed.

In addition, a second plate P2, known as an electrode plate is made for example of glass, on which a network of addressing lines L and columns C are placed, as well as a matrix of pixels Px. The electrical connections are carried out at the line and column ends. This second plate may be embodied in two masking levels, as described in the document FR-A-2 533 072.

So as to form the electric connection of the counter-electrode CE, rather than provide this connection directly on the counter-electrode plate P1, it is preferable to establish this connection on the electrodes plate P2 with the other connections. With this purpose in mind, special contacts 20 are provided disposed, for example, at the four corners of the plate of electrodes and made of a good conductive metal, such as aluminium. Of course, this means that it is essential to establish a link between the counter-electrode CE and these contacts 20. Conductive blocks 12 made, for example of silver paste, are thus disposed on the counter-electrode at locations corresponding to the locations of the contacts 20, that is in the variant shown, at the four corners of the counter-electrode.

So as to avoid any electrochemical phenomena and also any possible short-circuits between the plates, the plate of electrode P2 is generally coated with a nonconducting passivation film. For example, this may be a 300 nm film of silicon nitride. As regards this film coating the contacts 20, in order to establish the electric link between the counter-electrode CE and the contacts 20, it is necessary to pierce this film at the locations corresponding to the contacts. FIG. 2 shows a section of the zone for establishing the electric link between the counter-electrode CE and a contact 20 through an opening 24 pierced in the passivation film 22 and by means of the silver paste block 12.

The openings 24 are obtained by means of a complete photolithography operation with resin tapping, alignment, insolation and resin development, etching of the passivation film and elimination of the resin.

Once the two plates P1 and P2 have been formed and the passivation film etched at the appropriate locations, the method for forming the cell is continued by placing an alignment film on the plate of electrodes P2 and then by pulverizing the spaces. An alignment film is placed on the counter-electrode plate P1, a polymerisable glue cord 10 is serigraphed and then silver paste blocks 12 are placed by means of a syringe at the appropriate locations. After the two plates are assembled, the unit is annealed so as to polymerize the glue and the silver paste.

If this method provides satisfactory, it is clear that the operations for etching the openings 24 in the passivation film 22 heavily penalize the method which, without this additional etching, would remain simple since only two photoetchings are required, at least in the variant described in the aforesaid document FR-A-2 533 072.

The present invention is able to resolve this drawback by providing a method able to retain the passivation film without it nevertheless being necessary for any additional photolithography so as to establish the electric link between the counter-electrode and its contacts.

SUMMARY OF THE INVENTION

According to the invention, the electric link is established via the outer surface of the blocks, the extremity of the contacts having previously been uncovered.

More specifically, the invention concerns a method for forming a display cell whereby:

- a counter-electrode is placed on a first transparent plate,
- a polymerizable glue cord is placed on the circumference of the counter-electrode,
- contact blocks are placed on the counter-electrode outside the glue cord at appropriate locations,
- addressing lines and columns and pixel electrodes are placed on a second plate,
- counter-electrode connection contacts are formed at the periphery of this second plate,
- a nonconducting passivation film coating is placed on this second plate and, apart from other elements, covers the counter-electrode contacts, the method of the invention being characterized in that :
- so as to embody the blocks, a glue is used which cross-links at a temperature greater than the polymerization temperature of the glue of the cord,
- the two plates are assembled and the glue cord is polymerized, the contact blocks borne by the first plate being disposed above the counter-electrode contacts borne by the second plate but remaining separate from the latter via the passivation film,
- the blocks are exposed to a laser beam having sufficient power so as to calcine the glue of the blocks and render it conductive over the entire height of the block,
- with the aid of the laser beam, the passivation film is in addition perforated above the counter-electrode contacts and at least the counter-electrode contacts are partly perforated.

DETAILED DESCRIPTION OF THE PREFERRED EMBODIMENTS

Figure 3A:
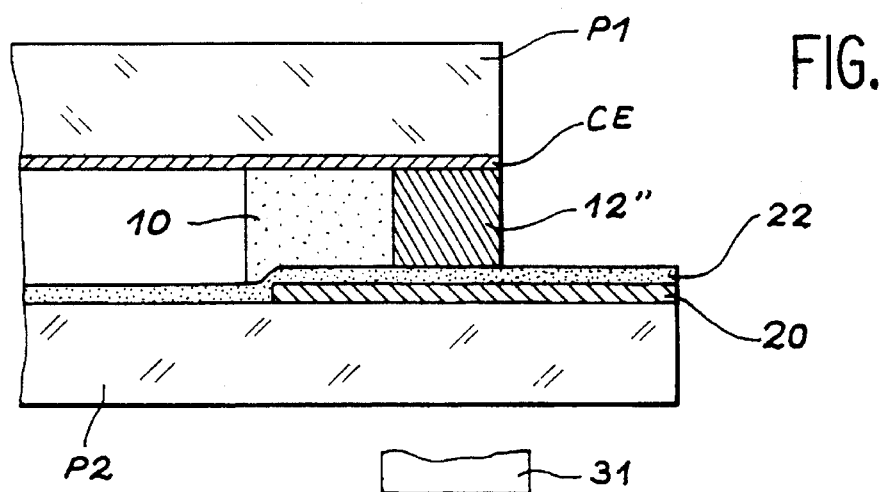
FIG. 3 shows two stages of the method of the invention.
Figure 3B:
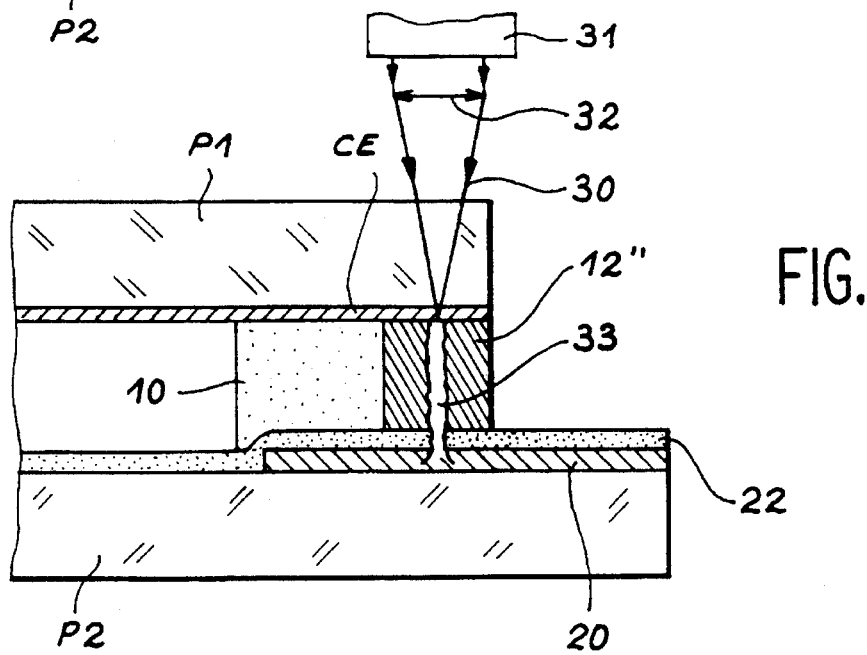

FIG. 3 shows two stages of the method of the invention.

The portion (a) shows the plate P1 (with its counter-electrode CE, its glue cord 10 and its contact blocks 12") resting on the plate P2 with its counter-electrode contacts 20 and its passivation film 22.

A glue cord is serigraphed on the counter-electrode CE polymerizable to ultraviolet rays, for example the glue ref. UVS 91 from the company NORLAND. Then placed in the zones reserved to this effect, for example in the corners, are thermocross-linking epoxy glue blocks, such as the glue H78 from the firm of NORLAND. This glue is nonconducting. Then the two plates P1 and P2 are assembled. The ultraviolet glue is insolated and the unit is heated to 60° C. for 12 hours, for example. At this particular moment, the thermic glue is not polymerized, as it would need be necessary for it to undergo a cycle at 150° C. for about 15 minutes. At 60° C., this glue is still soft and still contains some solvent.

Figure 1A:
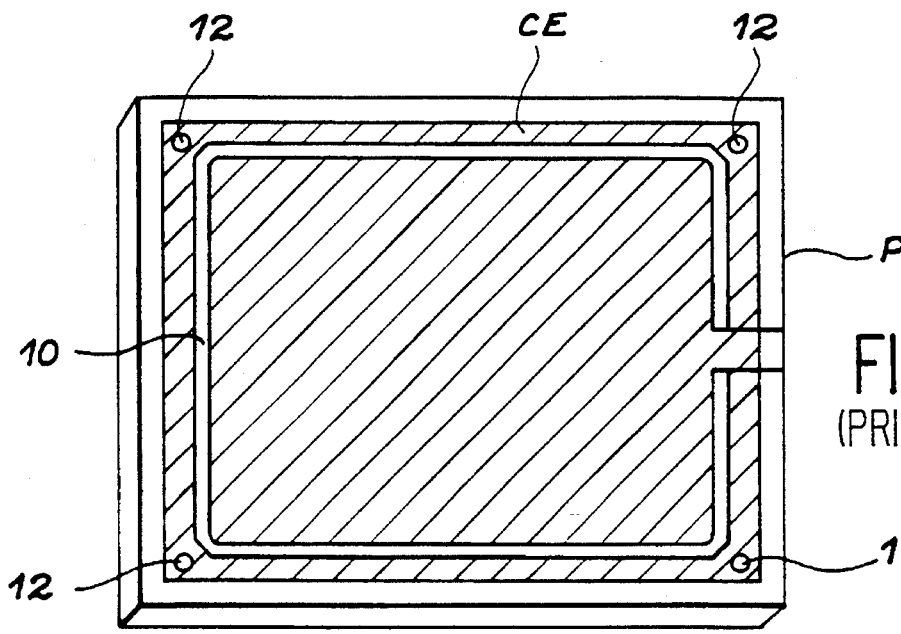
FIG. 1 shows the two plates of a display cell.
Figure 1B:
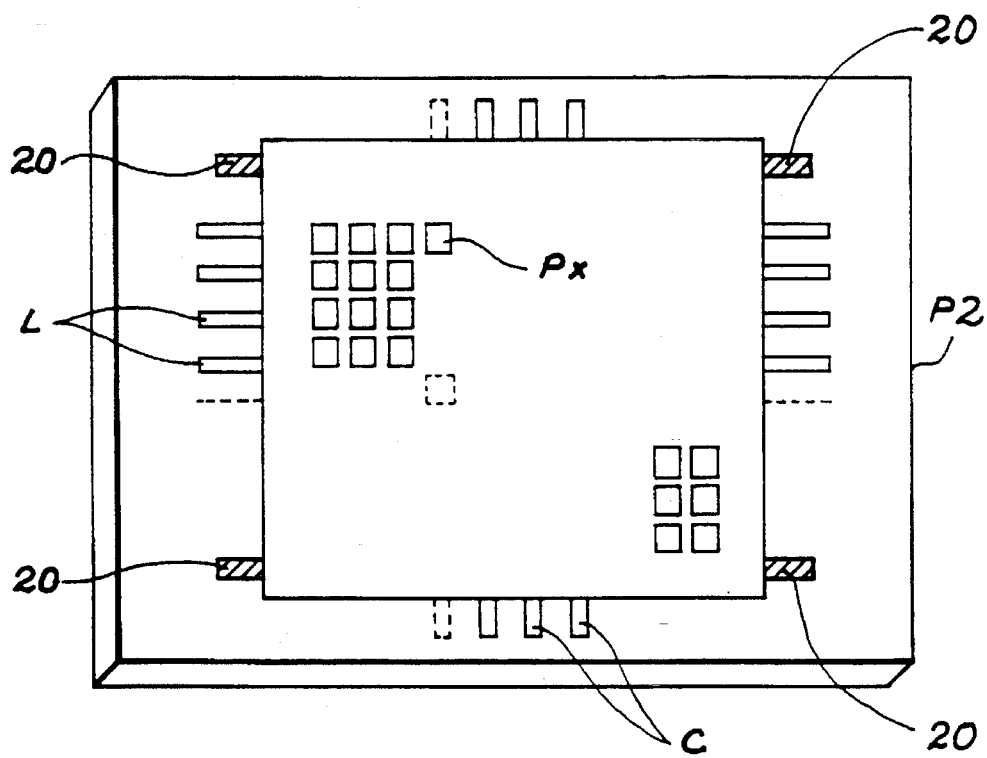
Figure 2:
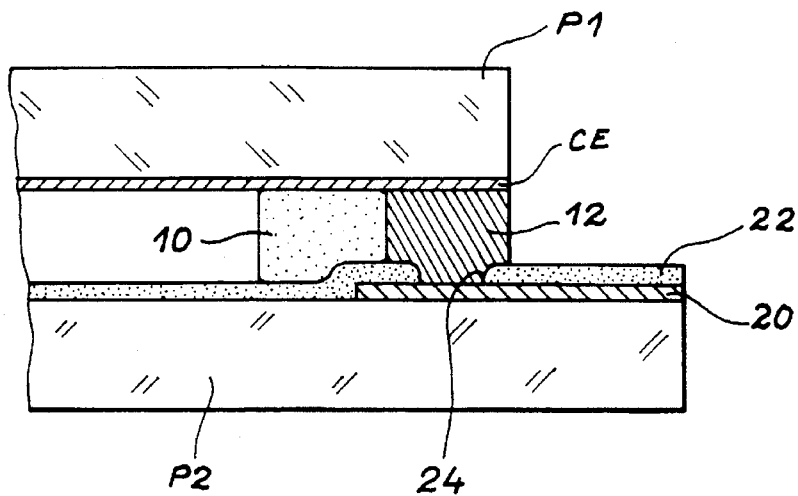
FIG. 2 is a section of a cell according to the prior art at the level of the counter-electrode contact.

The assembly obtained is shown on portion (a) of FIG. 2.

Then the blocks 12" are exposed to a vertical laser beam 30 with a wavelength of preferably between 0.45 and 0.5 μm, this beam being delivered by an ionized argon laser source 31 functioning continuously. The power may be about 300 mW. The beam passes into a focussing optical system 32 with 20× magnification, for example.

The laser beam 30 calcines the glue 12" over a width of about 10 μm. The cell or the irradiation unit is moved to calcine the block 12" on a strip with a length of about several millimeters. The glue then becomes conductive along this strip.

In addition, the passivation film 22 is perforated by the laser beam, as well as one portion of the metallic film 20 of the pick up contact. The consequence of this local burn-off is to ensure good electric conduction between the ITO of the counter-electrode CE and the metal of the pick up contact 20 by means of the calcined glue and through the perforated passivation film.

The contact resistance obtained in this variant is several tens of ohms.

The applicants have tested several types of thermic or polymerizable glues under ultraviolet rays. The best results have been obtained with a non-polymerized glue H78. This involves the use of ultraviolet glue for glueing the counter-electrode as the ultraviolet glue does not require any thermic treatment which would anneal the glue H78.

The method described above is compatible with a collective method for forming liquid crystal cells. In order to increase productivity, it is possible to form two large plates with one comprising several counter-electrode patterns and the other as many active matrixes as needed. These large plates are assembled and are thermically treated so as to glue them to each other and then the unit is broken along appropriate lines 55 so as to obtain individual cells.

Figure 4A:
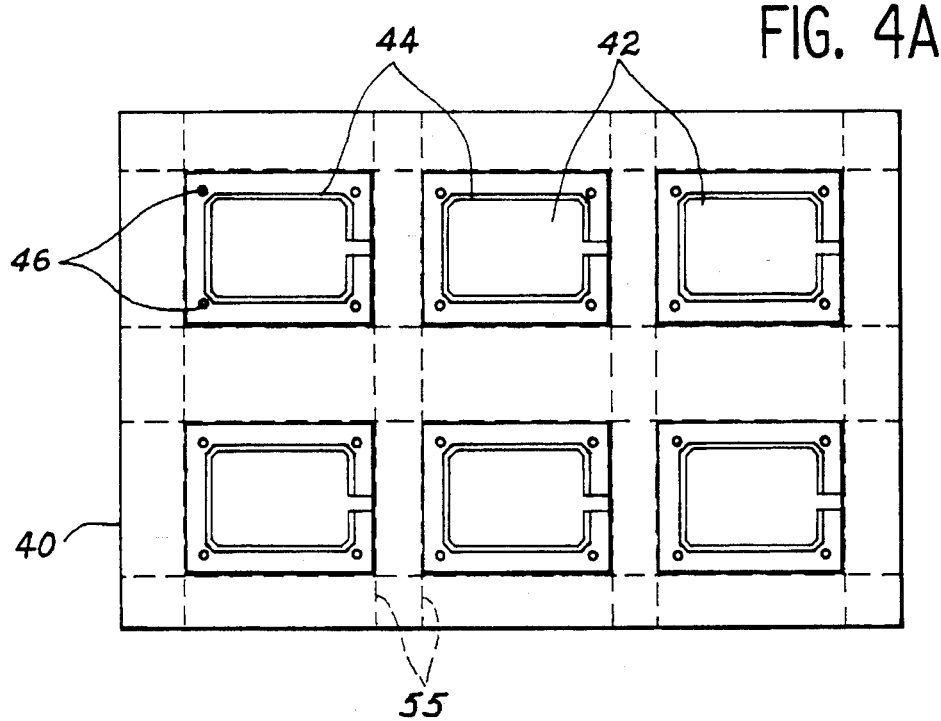
FIG. 4 shows the collective embodiment implementing the invention.
Figure 4B:
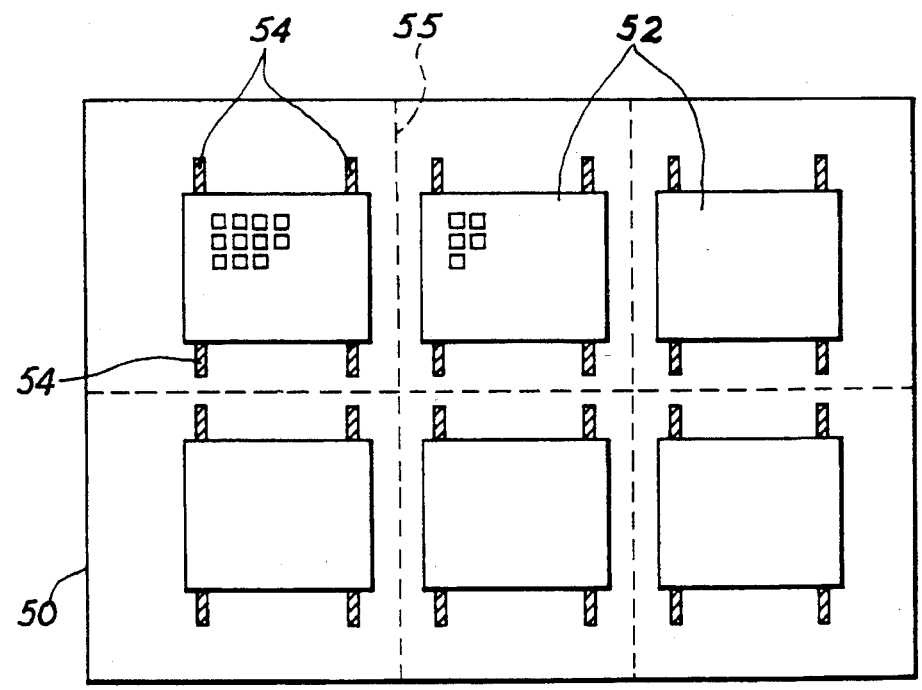

FIG. 4 shows how this is effected with the method for picking up contact of the counter-electrode described above. A first large plate 40 is formed with counter-electrode patterns 42 (six in the example shown). In addition, a second large plate 50 is embodied with pixel matrixes 52 and their counter-electrode contacts 54.

Two possibilities are offered. In the first, after serigraphy of the glue UV 44, drops of thermic glue 46 are placed. Then the two plates 40 and 50 are assembled and the glue UV 44 is insolated and then annealed for 12 hours at 60° C. It is then possible to make counter-electrode pick ups with the laser on the assembled plates. In the second, the large plates are cut, the individual cells are separated and the pick ups are carried out before or after filling.

The counter-electrode pick up prior to cutting is simpler as it requires far less handlings. It suffices to program the movement of the laser beam over the various pick up points, whereas in the second method, each cell needs to be handled.

What is claimed is:

1. Method for forming a display cell comprising the steps of:

placing a counter-electrode on a first transparent plate;

placing a polymerizable glue cord on the circumference of the counter-electrode;

placing contact blocks on the counter-electrode outside the glue cord;

placing addressing lines and columns and pixel electrodes on a second plate;

forming counter-electrode connection contacts at the periphery of the second plate;

placing a non-conducting passivation film coating on the counter-electrode contacts on the second plate;

wherein the contact blocks contain a glue which cross-links at a temperature greater than the temperature for polymerizing the glue of the cord;

wherein the two plates are assembled and the glue cord is polymerized, the contact blocks are disposed above the counter-electrode contacts but remain separate therefrom by means of the passivation film;

exposing the blocks to a laser beam having sufficient power to calcine the glue of the contact blocks and render the contact blocks conductive over their entire height; and perforating the passivation film above the counter-electrode contacts and partly perforating the counter-electrode contacts with the laser beam.

2. Method according to claim 1, wherein:

a first large plate includes several counter-electrode patterns and a second large plate includes a number of electrode units with counter-electrode contacts and a passivation film;

polymerizable glue cords are disposed on the first large plate around counter-electrode patterns;

duroplastic glue blocks are placed on the first large plate;

the first and second large plates are assembled;

the blocks are partly calcined over their height and the passivation film is perforated with the laser beam, while the large plates are still assembled;

the assembly is cut so as to separate the various cells; and each cell is filled and sealed.

* * * * *